United States Patent
Koomey et al.

[15] 3,701,549
[45] Oct. 31, 1972

[54] CONNECTOR

[72] Inventors: Paul C. Koomey, 970 Bunker Hill Road, Douwe DeVries, Tex.; Samuel E. Gilmore, 265 Bellaire, Bellaire, Tex.

[22] Filed: Oct. 9, 1970

[21] Appl. No.: 79,504

Related U.S. Application Data

[63] Continuation-in-part of Ser. No. 824,474, May 14, 1969, abandoned.

[52] U.S. Cl. ............... 285/24, 285/113, 285/131, 285/351, 285/379, 285/DIG. 18
[51] Int. Cl. ............................................ F16l 35/00
[58] Field of Search ........ 285/374, 24, 25, 26, 27, 28, 285/350, 325, 113, 326, 351, 327, 131, DIG. 11, DIG. 18; 166/0.6; 277/235, 170

[56] References Cited

UNITED STATES PATENTS

| | | | |
|---|---|---|---|
| 3,326,579 | 6/1967 | Fowler | 285/26 X |
| 672,598 | 4/1901 | Drew | 285/379 X |
| 1,891,670 | 12/1932 | Ernst | 17/132 |
| 2,354,538 | 7/1944 | Parker | 277/235 |
| 2,990,851 | 7/1961 | Jackson et al. | 166/0.6 |
| 3,193,311 | 6/1965 | Gordon | 285/379 X |
| 3,460,614 | 8/1969 | Burgess | 166/0.6 |
| 3,486,556 | 12/1969 | Burgess | 166/0.6 |
| 407,456 | 7/1889 | Williams | 285/379 X |

FOREIGN PATENTS OR APPLICATIONS

| | | | |
|---|---|---|---|
| 1,222,665 | 1/1960 | France | 277/235 |
| 24,405 | 0/1909 | Great Britain | 285/374 |

*Primary Examiner*—Dave W. Arola
*Attorney*—James F. Weiler, Jefferson D. Giller, William A. Stout, Paul L. De Verter, II and Henry W. Hope

[57] ABSTRACT

The present invention is directed to a connector of the type commonly used in underwater well drilling operations for control of the wellhead functions. The preferred embodiment utilizes a tapered stinger with a mating receptacle. A plurality of passageways are contained in both the stinger and receptacle, which passageways mate when the stinger is engaged in the receptacle. An improved annular seal is positioned around each of the stinger passageways to form a water and pressure tight seal with its mating receptacle passageway. Through these joined passageways hydraulic fluid, water or a mixture of both is pumped to perform the control functions. The seals are comprised of an annular resilient seal member which is secured to the stinger by an internally positioned retainer. A modification of the seal utilizes a reinforcing ring to prevent the flexible seal from improperly shifting positions in response to the pressure moving through the passageways.

19 Claims, 8 Drawing Figures

INVENTORS.
PAUL C. KOOMEY
DOUWE de VRIES
SAMUEL E. GILMORE

BY James F. Weiler
William A. Stout
Henry W. Hope
ATTORNEYS

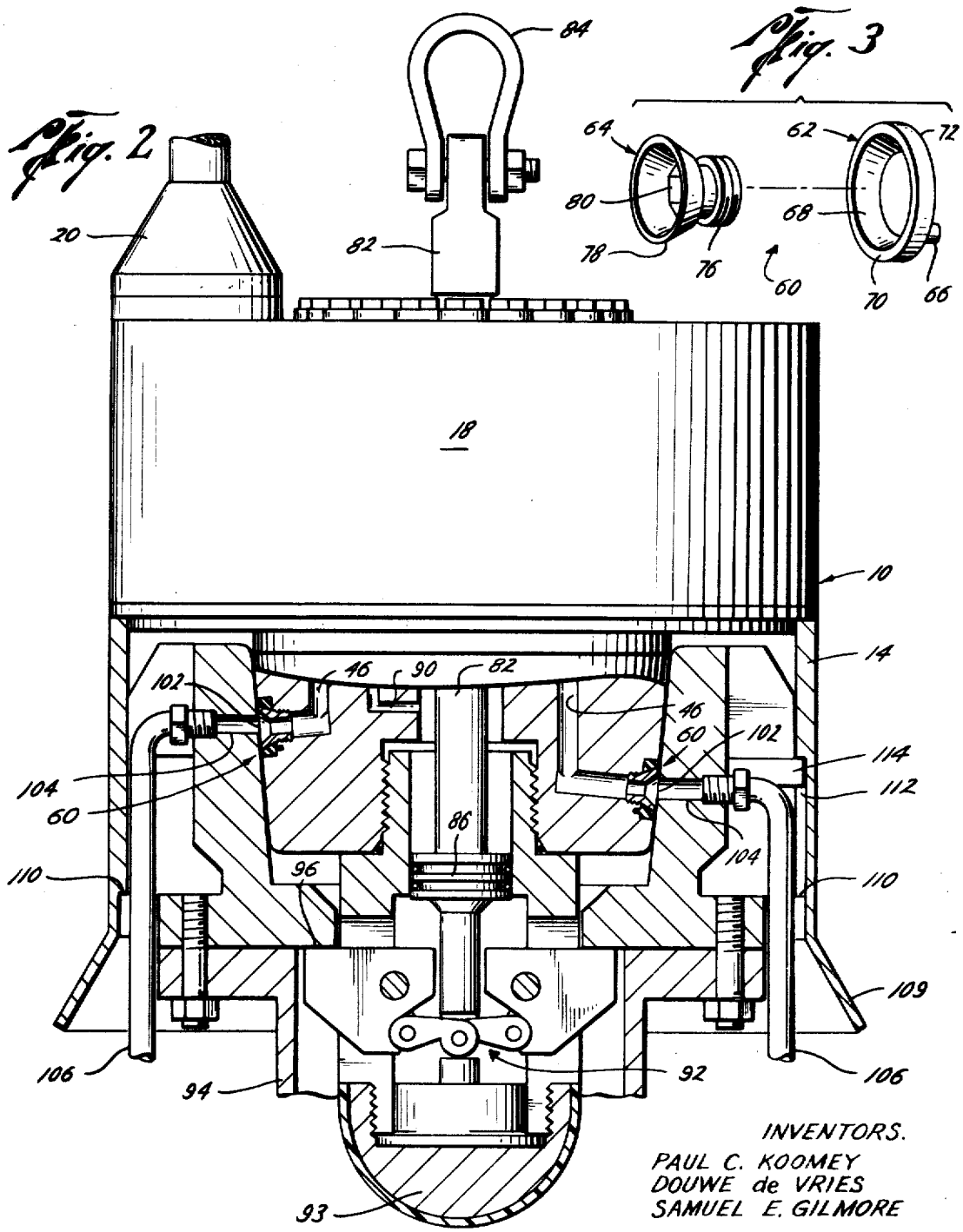

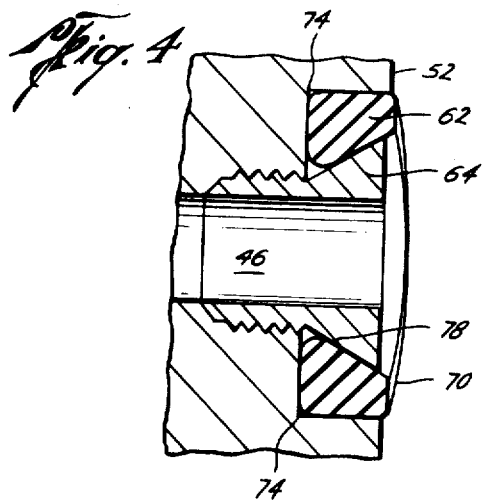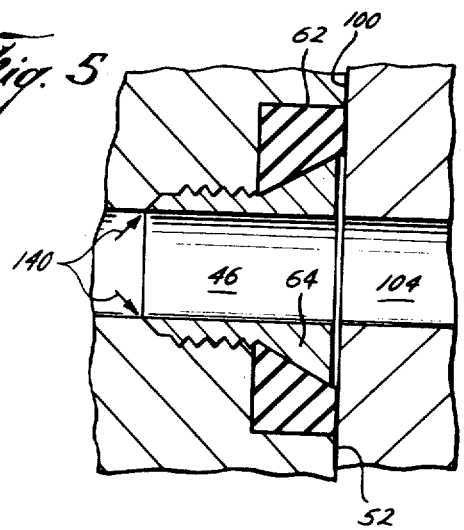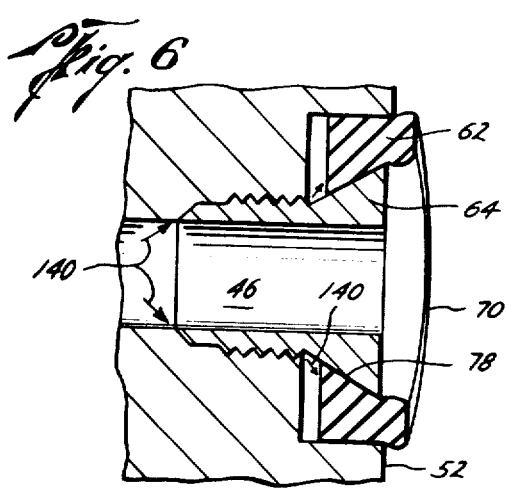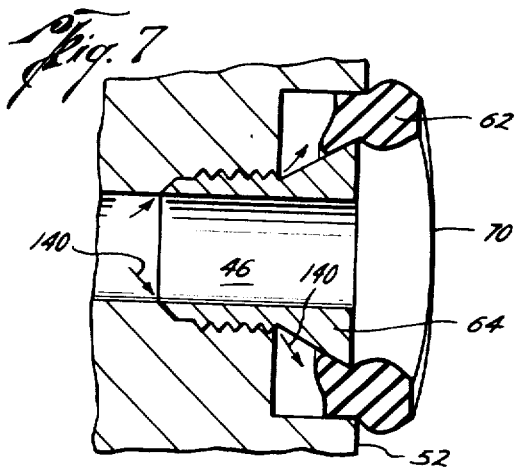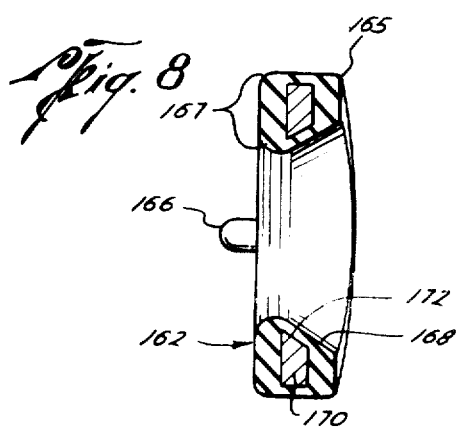

CONNECTOR

This application is a continuation-in-part of application Ser. No. 824,474, filed May 14, 1969, and now abandoned.

BACKGROUND OF THE PRESENT INVENTION

The present invention is directed to apparatus for easily and quickly connecting and disconnecting hydraulic control lines leading from remote controls to an operating platform or station, such as an underwater wellhead. The present invention further incorporates improved design of such apparatus which includes in part a seal about each passageway opening in the stinger surface, most of which passageway openings are located in the same or at least a plane common to other such openings.

There are many situations in which certain functions must be carried out from a remote distance, which functions can be performed by systems using hydraulic fluid, water or a mixture of both (all of which shall hereinafter be referred to as "hydraulic fluid" for simplicity) for the actuation and control of these functions. One of the most common examples of this is the drilling of oil and gas wells on the ocean floor, and accordingly, such a well drilling operation and the control of some of the wellhead functions for such a well drilling operation will be used herein as the illustration of an application for the present inventions as well as in the claims.

Such wells require some means to control the underwater wellhead equipment, and such control is best performed on the floor at the wellhead for a variety of reasons such as avoiding a multiplicity of hydraulic lines running to and from the wellhead and the equipment on the water surface. It is, of course, not feasible to operate these functions manually, and therefore, the control of the functions is generally done by remote control from the water surface.

Furthermore, in the operation of such apparatus, it is often necessary to connect and disconnect the control mechanisms. Such connection and disconnection takes place oftentimes during emergencies, as well as when moving the drilling equipment from one site to another. Since such drilling operations are quite expensive, it is necessary that the apparatus be able to perform such connect and disconnect operations in a quick and easy manner and without malfunction.

Several devices were developed to fill this need, such as shown in U.S. Pat. Nos. 2,990,851, and 3,486,556, as well as references cited in the prosecution of these patents. Such quick connect and disconnect apparatus are sometimes referred to as "stab connections" or "stab connecting apparatus." Such apparatus as these, however, usually required the openings of the control passageways leading through the stinger to be generally spirally located on the face of the male portion of the stinger. An annular recess communicated with each such passageway opening so that regardless of the orientation of the stinger as it was inserted into the receptacle, there would be communication between the stinger and receptacle passageways. O-ring seals of varying sizes were required to be positioned on the face of the stinger between each of the openings.

Such devices required relatively long, tapered stingers with the result of increased material costs and a substantial area of stinger and receptacle surface requiring extensive machining to insure a proper fit and seal. In addition, the annular grooves which communicated with the stinger passageways and the annular grooves for the O-ring seals required even additional time consuming and expensive machine work. The result of the above-mentioned features was that such connect apparatus required a substantial amount of time in production, and its production was relatively expensive. In addition, a reoccurring problem arose in that the O-ring seals would frequently blowoff as the stinger was inserted into the receptacle. This resulted due to the fact that, as the stinger is lowered to the ocean floor, pressure is transmitted through the stinger passageways to prevent them from becoming filled with sea water. As the mating surfaces of the stinger and receptacle came close together, the pressure would build up tending to force the O-ring seals out of their recesses. Since the seals were not yet in contact with the opposed receptacle surface, which contact is often essential in maintaining them in their recesses, such blow-offs would often occur.

Summary of the Present Invention

The present invention provides apparatus which seeks to overcome the above-mentioned disadvantages by providing a relatively short stinger for insertion into, and cooperation with, a correspondingly short receptacle. The passageways extending through the stinger terminate in one or possibly two or more common planes so that no lengthy stinger body is necessary. Improved seals have been developed and incorporated herein to allow such construction and to prevent the cross flow from one passageway to another without the use of the previously mentioned O-ring seals. Furthermore, means have been provided to properly orient the stinger as it is inserted into the receptacle.

It is, therefore, an object of the present invention to provide improved connector means for connecting hydraulic lines for the control of functions from a remote distance.

Still another object of the present invention is to provide improved connector means which may be economically made within a relatively short period of time, and yet which will provide reliable performance and long life.

Another object of the present invention is to provide improved connector apparatus utilizing a relatively short stinger and receptacle having each respective opening for the passageways within the stinger and receptacle situated in a plane or planes common to other such openings.

Yet another object of the present invention is to provide such connector apparatus having an improved seal positioned within each connection of the passageways previously mentioned to prevent cross-flow with the resulting cross control between passageways.

It is a further object of the present invention to provide a seal for such connector apparatus comprised of a resilient seal secured within each stinger passageway by a retainer member to provide a reliable and safe seal for each of the hydraulic fluid connections.

A still further object is to provide an embodiment of the resilient seal to prevent accidental displacement of the seal in response to pressure moving through the passageways, especially upon removal of the stinger from the receptacle.

These and other objects, features and advantages will be apparent from an examination of the following description of a presently preferred embodiment of the present invention given for the purpose of disclosure when taken in conjunction with the accompanying drawings.

BRIEF DESCRIPTION OF THE DRAWINGS

FIG. 2 is an elevation view of the apparatus of FIG. 1, partially in section, showing the apparatus in its connected position, FIG. 3 is an exploded, perspective view of the seal which is a part of the present invention, FIG. 4 is a partial view of a passageway opening, in section, showing the seal installed, FIG. 5 is a side, section view of the apparatus of FIG. 4 showing the seal after engagement with the receptacle, FIG. 6 is a side, section view of the apparatus of FIG. 4, showing the improper displacement of the seal following disengagement from the receptacle at 1,500 psi, FIG. 7 is a side, section view of the apparatus of FIG. 4 showing displacement of the seal following disengagement at 3,000 psi, and FIG. 8 is a side view, in section, of a second embodiment of the seal.

BRIEF DESCRIPTION OF THE PREFERRED EMBODIMENT

Figure 1:
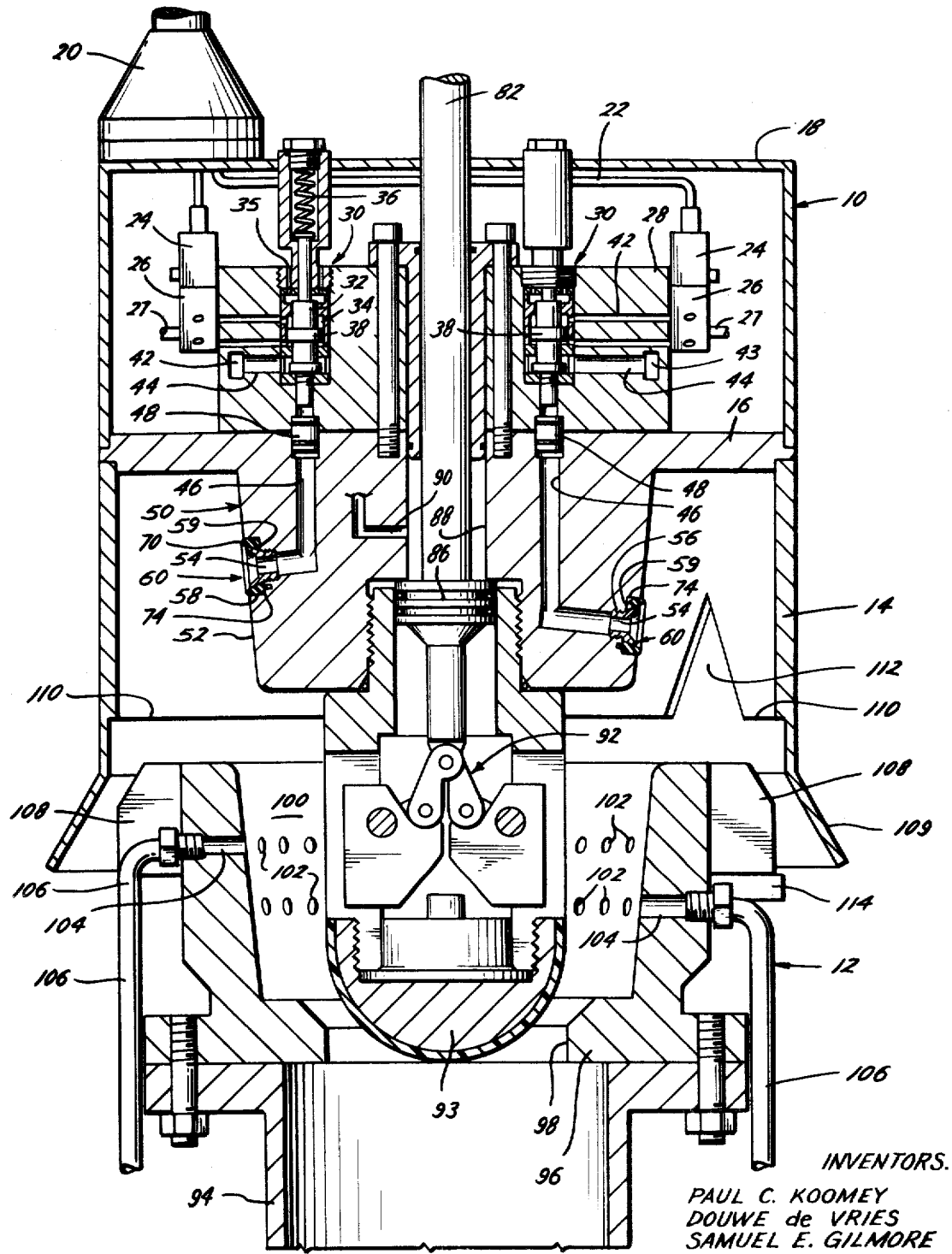
FIG. 1 is an elevation view of a preferred embodiment of the present invention, in section, showing the apparatus in a disconnected position.

Referring now to FIG. 1 of the drawings, the stinger of the present invention is generally indicated by the numeral 10, and the receptacle by the numeral 12. Discussing first the stinger, it is comprised of a shield 14 which connects to a circular flange 16. Extending upwardly from the flange 16 is a housing 18 which covers control and pilot valves discussed below. A junction box 20 is located on top of the housing 18 and provides an entry means for a plurality of electric cables 22 (only two of which are shown). Each of these cables lead to an electrically operated solenoid valve 24 which is operatively connected to a pilot valve 26. A hydraulic line 27 supplies hydraulic fluid to the pilot valve from a manifold (not shown) which in turn receives its fluid from either a subsurface pump or from a line leading from the surface (neither of which are shown.)

The pilot valves and solenoid valves are secured to the valve block 28, which block contains a plurality of control valves generally indicated by the numeral 30. Each control valve is actuated by its own pilot valve 26, and consists primarily of a spool 32 mounted for reciprocal movement in its valve chamber 34. These spools are, however, spring biased in a downward direction by the spring 36. Each spool 32 has a flange 38 on which the actuating pressure acts, as will be explained below. A passageway 40 leads from the pilot valve 26 to the chamber 34 and a second passageway 42 leads from the chamber 34 and thence into the ocean. This line 42 acts primarily to either equalize the pressure in the chamber 34 or to vent the portion of the chamber 34 above the flange 38 as the spool is raised. A manifold 43 in the valve block supplies hydraulic fluid by means of passageways 44 to the chambers 34.

A stinger passageway 46 leads from the chamber 34 of each of the control valves 30. Appropriate seal means 48 are positioned at the juncture between the valve block 28 and the actual stinger or male portion 50 of the stinger 10. This stinger portion 50 has a tapered exterior or outer surface 52 in which a plurality of enlarged openings 54 have been drilled to mate with each of the passageways 46. As can be seen from an examination of FIG. 1, a portion of each opening or passageway is threaded as at 56, and the opening 54 actually forms a recess 58 at the surface 52. This recess provides an annular shoulder 59.

Discussing now the basic embodiment of the seal 60, it is shown in greater detail in FIG. 3. The seal is comprised essentially of two parts, i.e., the resilient seal member 62 and the retainer 64. The resilient member 62 has a protuberance 66 which is received in an appropriately drilled hole within the stinger. This prevents the resilient member from rotating once secured to the stinger. The inner surface 68 of the resilient member is tapered downwardly from its rear to its leading edge or lip 70. Its outermost rearward edge 72 is somewhat curved so that a space 74 (see FIG. 1) is left between the resilient member 62 and the recess 58 for a purpose which will be explained below.

The retainer 64 has threads 76 on its innermost end, and an outwardly flared circular flange 78 on its outermost end. A central passageway extends through the retainer so that the stinger and receptacle passageways can communicate. This central passageway is shaped as at 80 to receive a hex wrench to provide means for screwing the retainer into and out of the passageway.

Discussing now the means for raising and lowering the stinger, a rod 82 extends through the center of the stinger and at its uppermost end carries a yoke 84 (see FIG. 2). This rod has piston means 86 fixedly secured thereto which reciprocate in a chamber 88. A hydraulic line 90 will supply hydraulic fluid to the chamber upon command from the control means on the water's surface to force the rod 82 downwardly when desired. Locking means, generally indicated by the numeral 92, are carried by the lowermost end of the rod 82 and are extended and actuated upon a downward movement of the rod 82.

Discussing now the receptacle 12, it is bolted onto a support 94 positioned at the wellhead. The receptacle 12 has a lower base portion which defines a circular flange 96 which cooperates with the previously discussed locking means as will be described. An opening 98 is, in turn, defined by this flange 96 and receives the nose 93 of the stinger.

The actual operative portion of the receptacle is generally cylindrically shaped, having an inner face or surface 100 which is tapered and machined to mate with the exterior surface 52 of the stinger. A plurality of openings 102 are located in the surface 100 of the receptacle, and each of these openings 102 communicate with a passageway 104. Each passageway 104 connects with a line 106 leading to the apparatus which is controlled by the flow of hydraulic fluid through that particular passageway.

A plurality of shoulders 108 are spaced around the upper periphery of the receptacle 12. These cooperate with the outwardly flared leading edge 109 of the shield 14, and with the nose 93 and opening 98, to guide the stinger properly into the receptacle. In addition, a circular or peripheral shoulder 110 is carried by the interior surface of the shield 14. A V-shaped groove or notch 112 is the only break in this shoulder. A lug or protuberance 114 which has a cross-sectional configuration similar to at least the top portion of the groove 112 extends outwardly from the receptacle a distance which is at least sufficient to cause interference between the lug 114 and the shoulder 110 as the stinger is lowered into the receptacle.

In operation, a cable is connected to the yoke 84 and the stinger is lowered through the ocean to the wellhead. The rod, at this point, is in the position shown in FIG. 1. As the stinger nears the receptacle, the outwardly flared ends 109 contact the shoulders 108 as an initial guiding means. It should perhaps be noted that additional guiding means are usually provided in this sort of operation, as is more fully set forth in the previously mentioned patent application, Ser. No. 634,923. This application also sets forth much of the structure and operation of the underwater connector and may be referred to for further details of the basic operation. Such additional operational disclosure is, therefore, incorporated here by reference.

At some point during the lowering of the stinger into the receptacle, the lug 114 will contact the shoulder 110 unless the lug happens to be aligned with the notch 112. As shown in FIG. 1, the shoulder and lug are not in alignment, and complete insertion of the stinger into the receptacle cannot be accomplished. When contact is made between the shoulder and lug, the stinger is rotated from the surface, or from beneath the surface, by divers, for example, until the lug 114 is received by the notch. Following this, the stinger is lowered the remainder of the way into the receptacle until it is seated therein as shown in FIG. 2.

When such seating contact is made, hydraulic fluid is directed through the line 90, (for example, through a control valve 30 in the manner explained below) which fluid acts on the piston portion 86 of the rod 82 forcing the rod downwardly into its position shown in FIG. 2. As the rod 82 moves downwardly, the actuating links on the locking means causes the levers to rotate outwardly and to contact the shoulder 96, thus securing the stinger within the receptacle. Reference should also be made to the application, Ser. No. 634,923 for a complete explanation of this locking apparatus.

The stinger is now in its engaged position. When in this engaged position, the passageways 46 are in alignment with a corresponding passageway 104. Thus, fluid communication is established between the two. By the cooperation of the lug 114 and notch 112, the operators are assured that when completely seated and engaged, each passageway 46 is in alignment with the proper passageway 104. This enables the operators to know which function will be performed when hydraulic fluid is sent through any particular passageway 46.

In order to move such fluid through the passageway, an electric signal is sent through the appropriate cable 22 to actuate its solenoid switch 24. This shifts the ports within the pilot valve 26, allowing hydraulic fluid from the line 27 to flow through the passageway 40 and into the chamber 34. This fluid acts on the lower surface of the flange 38 to raise the spool from its seated position shown in FIG. 1, lifting the bottom of the spool from the bottom of the chamber to allow hydraulic fluid from the manifold 42 into the passageway 46. This fluid will then flow through the appropriate passageways 46 and 104, and a line 106 to the piece of equipment that is to be actuated. During this actuating operation, the passageway 42 functions as a vent to allow water or the like to flow from the portion of the chamber 34 above the flange 38 as the spool moves upwardly.

When this particular function is to be halted, a second signal is sent through the electric cable 22 which deenergizes the solenoid valve 24. The ports within the pilot valve are returned to their original positions, thereby venting into the ocean both lines 42 and 40. Hydraulic fluid from chamber 34 below the flange 38 will exit through passageway 40 and the line 42 will allow ocean water to flow into the chamber 34 to prevent a vacuum from being created above the flange 38. Thus, the spool 32 will again reseat itself in the position shown in FIG. 1. The hydraulic fluid previously sent through the line 46 and which is there under pressure, will be vented through the hollow center (not shown) of the spool 32 and out passageways 35 into the ocean.

It is important, of course, to the successful operation of the present invention that the seal be maintained between each stinger passageway 46 and receptacle passageway 104. This is accomplished by the seal of FIG. 3 in the following manner. The resilient member 62 is placed within the recess 58, and the retainer is then screwed into the passageway. The outwardly flared flange 78 acts against the resilient member 62 to compress it into the recess in a manner well understood by those skilled in this art. The lip 70 will extend beyond the surface 52 of the stinger (see FIG. 4) to provide a more secure contact and seal with the surface 100 of the receptacle. As the stinger and receptacle move into their engaged positions, however, this lip 70 will be forced back into the recess. The space 74 is provided for this purpose. It should be noted, however, that the space 74 is not large enough to receive all of the lip 70 so that additional compression on the resilient member 62 results from the contact with the receptacle surface 100 (see FIG. 5). Thus, compression is placed into the resilient member 62 by the action of the retainer 64, and by the action of the receptacle wall 100. This combined action provides a normally secure seal, thus preventing the escape of hydraulic fluid from one passageway or into yet another passageway. Such would, of course, be undesirable for a variety of reasons, one of which is that such cross flow could very easily result in cross control of the various functions performed.

Under certain high pressure conditions, however, the basic embodiment of the seal 62 does not function in a satisfactory manner. This is illustrated by a comparison of FIGS. 4–7. FIG. 4 discloses the seal in its normal position after proper installation and before engagement with the receptacle. The view in FIG. 5 shows the seal after proper engagement. The space 74 has been completely filled by the resilient member 62 as a result of the pressure from the surface 100.

During engagement, high pressure actuating or control fluids are transmitted through the passageways 46 and 104. As will be readily understood, such pressure can be transmitted outside the retainer 64 and into contact with the innermost surface of the resilient seal 62 as indicated by the arrows 140. Generally, no problem results as long as engagement with the receptacle is maintained due to the fact that the seal is securely held in place.

Upon disconnection, however, either accidental or intentional, continued pressure in the passageway 46 can force the seal outwardly in spite of the retainer 64. FIG. 6 shows the outward displacement of the seal as it would be effected by a 1,500 psi force following disengagement from the receptacle. FIG. 7 shows outward displacement at 3,000 psi under the same conditions. Clearly, this is unsatisfactory for obvious reasons, such as increased maintenance and the destruction of the seal 62 by its being sheared off upon re-engagement with the receptacle.

To prevent such displacement of the resilient seal 62, a modified seal 162 may be employed for high pressure situations. The exterior configuration of the seal 162 is identical to the resilient seal 62. It utilizes the same chamfer at 165 and the same radii at 167. It also has the protuberance 166. This modified seal differs from its basic embodiment in the utilization of a reinforcing ring 170. This ring may be made from carbon steel but any other suitably strong and hard material is satisfactory. The inner surface 168 of the resilient member is tapered to conform with the outer surface of the retainer 64. It will be noted in FIG. 8 that the ring 170 also has a tapered inner surface 172 which is essentially parallel with the tapered surface 168 of the resilient member.

In operation, the reinforcing band 170 acts against the flared circular flange 78 on the retainer 64 to prevent the displacement shown in FIGS. 6 and 7. Thus, the improved seal provides means to prevent accidental displacement with resulting increased maintenance, improper operation or destruction of the resilient seal upon re-engagement of the stinger and receptacle. As with the basic seal, however, the simplicity of the seal is maintained both in its manufacture and operation, and its interchangeable character is also continued.

The seals can, of course, be placed on either the stinger or the receptacle. It is, nevertheless, desirable to have them on the stinger as shown in the drawings due to the fact that the receptacles are left beneath the ocean and replacement and maintenance cannot be performed as easily as with the stinger which can be returned to the surface. In addition, the metal surfaces 52 and 100 may be machined to form a metal seal where desired which would supplement the effect of the seals 60.

As has been previously pointed out, it is essential to the proper operation of the present invention, that the stinger be properly oriented as it is inserted into the receptacle so that the oeprators can know with certainty what functions will be performed by the opening of each valve. This orientation can be accomplished in a variety of ways and the preferred embodiment has been shown in FIGS. 1 and 2 and its operation explained previously. The notch 112 and the lug 114 could, of course, be reversed with the lug being positioned on the shield 14, and the notch on the receptacle. Another arrangement which would perform satisfactorily would be having either the lug or the notch positioned within the inner surface of the receptacle with the other of the lug or notch positioned on the outer surface 52 of the stinger. A variety of other arrangements which would give satisfactory results will come readily to mind to one skilled in this art. As somewhat of a safety factor, the openings or recesses 58 in the stinger surface 52 may be enlarged to insure communication with the corresponding receptacle passageway should the alignment not be directly on center.

As can be seen, therefore, the present invention is well adapted to achieve the objects set forth at the outset. A device has been disclosed which will reduce substantially the size of a stinger and receptacle needed for such a connector, as well as related parts, thereby decreasing substantially the cost involved as to materials as well as machining needed. The apparatus of the present invention by way of example, would be approximately one-third the length of a comparable tool as manufactured in accordance with the disclosures of the previously mentioned U.S. Pat. No. 2,990,851 or patent application Ser. No. 634,923. In addition, the plurality of O-rings of various sizes necessary in these devices would not be required with the present invention, nor would the machining be necessary to form the numerous recesses to receive these O-rings, as well as the annular grooves which is needed for proper communication of the passageways of these conventional connectors. By contrast, the seal members of the present invention are interchangeable, each one being the same size.

Accordingly, a device which is economical in construction, operation and maintenance has been devised that will function in a most reliable manner and that will provide a long and service-free life. Should the resilient members of the seals begin to wear out, they may be replaced for substantially less cost than the corresponding O-ring seals used in conventional apparatus. In addition, the problem of the O-rings blowing out during the engaging operation has been done away with.

For purposes of this application and the for appended claims, the term "engaged" when used to describe the positions of the stinger and receptacle relative to each other, is used to describe the position of the stinger when it is completely seated in the receptacle (although it need not be locked). Any position short of such seating will be generally referred to by the use of the word "insert" or "inserting."

What is claimed is:

1. An underwater wellhead connector comprising:
   a receptacle,
   a stinger engageable in said receptacle when inserted into the receptacle,
   at least one passageway in said receptacle,
   at least one passageway in said stinger, one end of each of said passageways mating for fluid communication between said passageways when said stinger is engaged in the receptable opening,
   annular seal means around one of said passageways at its mating end for forming a water-tight seal between the ends of said passageways and
   alignment means for aligning the stinger as it engages the receptacle for the mating of said passageways,
   said annular seal means being further defined as including, an annular resilient seal mounted about the mating end of said one passageway, and retainer means for securing the resilient seal about said one passageway, said resilient seal being further defined as including, reinforcing means secured to the resilient seal and cooperating with the retainer means to prevent undesired outward displacement of the resilient seal.

2. The invention of claim 1 wherein said reinforcing means is defined as, a retention ring secured to said seal, a portion of the ring being of a smaller diameter than the retainer means, whereby the ring and attached resilient seal cannot be displaced beyond the retainer means.

3. An underwater well head connector comprising:

a receptacle, a stinger engageable in said receptacle when inserted into the receptacle, at least one passageway in said receptacle, at least one passageway in said stinger, one end of each of said passageways mating for fluid communication between said passageways when said stinger is engaged in the receptable opening, annular seal means around one of said passageways at its mating end for forming a water-tight seal between the ends of said passageways and alignment means for aligning the stinger as it engages the receptacle for the mating of said passageways, said annular seal means being further defined as including, an annular resilient seal mounted about the mating end of said one passageway, retainer means for securing the resilient seal about said one passageway, said resilient seal having a circular lip extending outwardly to contact the receptacle and form a seal, the retainer means being threadedly engaged in said one passageway and including, an opening therethrough for fluid communication by the passageways, and flared circular flange means for compressing the resilient seal against said one passageway to insure a proper seal between the passageways.

4. The invention of claim 3 and further including a reinforcing ring secured to the resilient seal and having at least a part of the ring of a smaller diameter than the flange means, whereby the rings cannot pass over the flange means, thereby preventing undesired outward displacement of the resilient seal.

5. The invention of claim 3 and further including, an outer surface on the stinger, an inner surface in the receptacle, said surfaces being in contact when the stinger is engaged with the receptacle, a metal water-tight seal being defined by at least a portion of said surfaces when the stinger and receptacle are engaged.

6. The invention of claim 5 wherein, the circular lip extends beyond the surface surrounding said one passageway whereby the resilient seal is further compressed when said inner and outer surfaces are in contact.

7. The invention of claim 6 and further including, a recess in said one passageway for receiving the resilient seal, said retainer means compressing the resilient seal into said recess when the retainer means is threaded into said one passageway., said recess being larger than the portion of the resilient seal contained in the recess when compressed therein by the retaining means by a volume that is less than the volume of the portion of the resilient seal extending beyond said surface, whereby the lip can be received in said recess when subjected to said further compression.

8. A wellhead connector comprising:

a receptacle for positioning at the wellhead and having an inner wall surface, a stinger engageable in said receptacle, the inner wall surface of the receptacle and the outer wall surface of the stinger contacting when they are so engaged, a plurality of passageways in the receptacle, one end of each passageway terminating at said inner wall surface, a plurality of passageways in the stinger, one end of each terminating at the outer wall surface for mating with one of said receptacle passageway ends when the stinger and receptacle are engaged, an annular seal means secured about each of said stinger passageways for forming a seal between it and its mating receptacle passageway end, and alignment means on said receptacle and stinger for aligning the stinger as it engages the receptacle for the mating of said passageways, each of said annular seal means being further defined as including, a generally cylindrically shaped resilient seal, and retainer means releasably secured to the stinger for retaining the seal in position.

9. The invention of claim 8 wherein the resilient seal is further defined as including, reinforcing means secured to the resilient seal and cooperating with the retainer means to prevent undesired outward displacement of the resilient seal.

10. The invention of claim 9 wherein said reinforcing means is defined as, a retention ring secured to said seal, a portion of the ring being of a smaller diameter than the retainer means, whereby the ring and attached resilient seal cannot be displaced beyond the retainer means.

11. The invention of claim 8 wherein said retainer means includes, a circular flange, an annular opening defined by the flange and the passageway sidewall, said resilient seal being secured in said opening by the flange.

12. The invention of claim 11 wherein, said flange is flared outwardly toward the walls of the passageway, whereby the outermost part of the opening is narrower in cross-section than is the innermost part, said resilient seal having an enlarged inner section cooperating with the flange to prevent outward displacement of the resilient seal.

13. The invention of claim 12 and including, reinforcing means secured to said enlarged portion of the resilient seal for preventing unwanted outward displacement thereof.

14. The invention of claim 13 wherein, said reinforcing means is further defined as, a ring secured to the enlarged portion, at least a part of the ring being of a smaller diameter than said flange.

15. The invention of claim 8 wherein each annular seal means is further defined as including,
a lip on the resilient seal which extends beyond the outer surface of the stinger, whereby the seal is further compressed when the stinger is engaged in the receptacle.

16. A wellhead connector comprising:
a receptacle for positioning at the wellhead and having an inner wall surface,
a stinger engagable in said receptacle, the inner wall surface of the receptacle and the outer wall surface of the stinger contacting when they are so engaged,
a plurality of passageways in the receptacle, one end of each passageway terminating at said inner surface,
a plurality of passageways in the stinger, one end of each terminating at the outer surface for mating with one of said receptacle passageway ends when the stinger and receptacle are engaged,
alignment means on said receptacle and stinger for aligning the stinger as it engages the receptacle for the mating of said passageways, and
an annular seal means secured about each of said stinger passageways for forming a seal between it and its mating receptacle passageway end, each annular seal means including
a generally cylindrically shaped resilient seal, and
retainer means releasably secured to the stinger for retaining the seal in position,
the inner and outer surfaces defining seals around said passageways when said surfaces are in contact.

17. A wellhead connector comprising:
a receptacle for positioning at the wellhead and having an inner wall surface,
a stinger engagable in said receptacle, the inner wall surface of the receptacle and the outer wall surface of the stinger contacting when they are so engaged,
a plurality of passageways in the receptacle, one end of each passageway terminating at said inner surface,
a plurality of passageways in the stinger, one end of each terminating at the outer surface for mating with one of said receptacle passageway ends when the stinger and receptacle are engaged,
alignment means on said receptacle and stinger for aligning the stinger as it engages the receptacle for the mating of said passageways, and
an annular seal means secured about each of said stinger passageways for forming a seal between it and its mating receptacle passageway end, each annular seal means including,
a generally cylindrically shaped resilient seal,
retainer means releasably secured to the stinger for retaining the seal in position, and
a lip on the resilient seal which extends beyond the outer surface of the stinger, whereby the seal is further compressed when the stinger is engaged in the receptable,
said stinger passageway including,
a recess portion for receiving the resilient seal,
the retainer means compressing the resilient seal into said recess when the retainer means is secured to the stinger,
said recess being larger than the portion of the resilient seal contained in the recess when compressed therein by the retaining means, whereby the lip extending beyond the outer surface of the stinger can be received in said recess when subjected to said further compression by the receptacle.

18. The invention of claim 17 wherein,
each recess is larger than its respective resilient seal when compressed therein by the retainer means by a volume that is less than the volume of the lip that extends beyond said outer surface.

19. The invention of claim 18 wherein,
each retainer means is threaded into its respective passageway and includes,
an opening therethrough for communication by its mating passageways and further including,
a shoulder in the passageway which controls a portion of the retainer means when it is threaded into the passageway, thereby preventing further movement of the retainer means into the passageway.

* * * * *